Patented Jan. 12, 1926.

1,569,662

UNITED STATES PATENT OFFICE.

THOMAS W. MILLER, OF ASHLAND, OHIO.

METHOD OF MANUFACTURING RUBBER ARTICLES AND VULCANIZING THE SAME.

No Drawing.   Application filed May 24, 1923.   Serial No. 641,245.

*To all whom it may concern:*

Be it known that I, THOMAS W. MILLER, a citizen of the United States, residing at Ashland, county of Ashland, State of Ohio, have invented certain new and useful Improvements in Methods of Manufacturing Rubber Articles and Vulcanizing the Same, of which the following is a specification.

My invention relates to the vulcanization of rubber and the like, and has for its object to provide an improved method of forming the article to be vulcanized, whereby a perfect vulcanization may be effected in a comparatively short time and at a low temperature, and whereby all danger of premature vulcanization of the compound upon the mill and calender rolls will be avoided.

It is well known that in order to obtain a quick vulcanization of rubber at low temperature, it is necessary that the mixture or compound contain, in addition to the sulphur, some form of well known organic accelerator, and it is also highly desirable that a metallic oxide, such as zinc oxide, be employed. But in the preliminary treatment of a batch containing these ingredients it has been found that the milling and calendering of the same are liable to cause a premature vulcanization, due to the heat engendered, and it is to obviate this result that my present invention is directed. This I accomplish by forming the material in two separate batches, each of said batches containing a portion of rubber, metallic oxide, sulphur and organic accelerator, the proportions in each batch being such that during the necessary preliminary milling and calendering there will not be enough of the materials in either batch to cause an appreciable preliminary vulcanization. It is well known, however, that these ingredients when brought into juxtaposition, as when contained in separate sheets or plies brought together, will, under the influence of a moderate heat, migrate or interpenetrate into the various plies, whereby an effective vulcanization of the material as a whole under said heat will be accomplished.

I have found that in the preparation of these batches, the following formulæ will produce very satisfactory results, though I do not wish to be understood as limiting myself to the proportions named, which may be varied within certain limits without departing from the spirit of my invention:—

Batch A:

| | Parts. |
|---|---|
| Rubber | 50 |
| Metallic oxide | 5 |
| Sulphur | 0.5 |
| Organic accelerator | 0.5 |

Batch B:

| | Parts. |
|---|---|
| Rubber | 50 |
| Metallic oxide | 5 |
| Sulphur | 1.5 |
| Organic accelerator | 0.25 |

These stocks may be milled and calendered, and plies of the same of any suitable thickness may be formed, which plies may be used to build up an article formed from as many of said plies as may be desired, the same being disposed alternately, and the article so built up will contain as a whole a sufficient amount of said ingredients necessary to effect the desired vulcanization under a moderate heat.

And this same method may be followed with equally good results in the preparation of dipped rubber goods, the ingredients being dissolved into two separate solutions, and the article formed by dipping alternately in the one solution and then in the other, the result being a built-up article which will vulcanize under the desired temperature, the separate solutions being immune from any appreciable preliminary vulcanization.

If after an article has been built-up from a plurality of plies formed from these batches, and before vulcanization, it is found desirable to supply additional quantities of sulphur, organic accelerator, or metallic oxide, these materials, or any combination of the same, may be dusted on the surface of the article, or may be applied in the form of a vapor or gas under heat, or through the medium of the hot liquid in which the article is placed for vulcanization, when such form of vulcanization is employed.

Having thus fully described my invention, what I claim as new and desire to secure by Letters Patent, is:—

1. The method of forming a rubber article, which comprises forming a stock containing each of a group of agents of vulcanization which in a proper proportion would produce vulcanization under working conditions, but in a proportion ineffective to produce such vulcanization under the same conditions.

2. The method of forming a rubber article which comprises forming a plurality of stocks each containing each of a group of agents of vulcanization which in a proper proportion would produce vulcanization under working conditions, each containing these agents in a different proportion, and each containing these agents in a proportion ineffective to produce such vulcanization under the same conditions, uniting said stock, and vulcanizing.

3. The method of forming a rubber article which comprises assembling a plurality of plies each containing each of a group of agents of vulcanization which in a proper proportion would produce vulcanization under working conditions, each containing these agents in a different proportion, and each containing these agents in a proportion ineffective to produce such vulcanization under the same conditions, and vulcanizing.

4. The method of forming a rubber article which comprises assembling a plurality of plies each containing each of the agents of vulcanization, each containing these agents in a different proportion, each containing these agents in a proportion ineffective to produce vulcanization under working conditions, and together containing these agents in the proportion desired for vulcanization of the article.

5. The method of forming a rubber article which comprises assembling a plurality of plies each containing sulphur, each non-vulcanizing under working conditions, and together containing the accelerator and other agents of vulcanization in a proper proportion to produce vulcanization of the article, under the same working conditions, and vulcanizing.

6. The method of forming a rubber article which comprises assembling a plurality of plies each containing accelerator, each non-vulcanizing under working conditions, and together containing the sulphur and other agents of vulcanization for the vulcanization of the article, under the same working conditions, and vulcanizing.

7. The method of forming a rubber article which comprises assembling a plurality of plies each containing accelerator and sulphur, each non-vulcanizing under working conditions, and together containing the agents of vulcanization for the vulcanization of the article, under the same working conditions, and vulcanizing.

8. The method of forming an article of vulcanizable rubber compound, which consists in juxtaposing a plurality of plies of rubber compound, each ply containing a part of each ingredient necessary to effect vulcanization, the quantities and proportions of said ingredients in each ply being such as to render said plies substantially non-vulcanizing under the heat engendered in preliminary treatment such as milling, calendering and the like.

9. The method of forming an article of vulcanizable rubber compound, which consists in juxtaposing a plurality of plies of rubber compound, each ply containing a part of each ingredient necessary to effect vulcanization, the quantities and proportions of said ingredients in each ply being insufficient to cause vulcanization under the heat engendered in preliminary treatment such as milling, calendering and the like.

10. The method of forming an article of vulcanizable rubber compound, which consists in juxtaposing a plurality of plies of rubber compound, each ply containing a portion of rubber, metallic oxide, sulphur and an organic accelerator, the quantities and proportions of said ingredients in each ply being different and being insufficient to cause vulcanization under the heat engendered in preliminary treatment such as milling, calendering and the like.

11. The method of vulcanizing rubber, which consists in assembling in separate batches the several desired ingredients, such as rubber, metallic oxide, sulphur and an organic accelerator, each batch containing a part of each of said ingredients in different proportions, then juxtaposing a plurality of plies formed from said batches, and finally vulcanizing the article formed by said juxtaposed plies.

In testimony whereof, I hereunto affix my signature.

THOMAS W. MILLER.